(12) United States Patent
Megiddo

(10) Patent No.: US 7,013,344 B2
(45) Date of Patent: Mar. 14, 2006

(54) MASSIVELY COMPUTATIONAL PARALLIZABLE OPTIMIZATION MANAGEMENT SYSTEM AND METHOD

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/045,857

(22) Filed: Jan. 9, 2002

(65) Prior Publication Data

US 2003/0158887 A1    Aug. 21, 2003

(51) Int. Cl.
*G06F 15/16* (2006.01)

(52) U.S. Cl. ............... 709/232; 709/213; 709/230; 718/107

(58) Field of Classification Search ........ 709/200–206, 709/219–225, 213, 216, 230–236; 705/1, 705/30; 718/105, 100, 104, 107
See application file for complete search history.

(56) References Cited

U.S. PATENT DOCUMENTS

| 5,694,602 | A  | * | 12/1997 | Smith | 718/105 |
|---|---|---|---|---|---|
| 5,781,775 | A  | * | 7/1998 | Ueno | 718/102 |
| 5,978,830 | A  | * | 11/1999 | Nakaya et al. | 718/102 |
| 6,112,225 | A  |  | 8/2000 | Kraft et al. | 709/202 |
| 6,223,205 | B1 | * | 4/2001 | Harchol-Balter et al. | 718/105 |
| 6,240,462 | B1 | * | 5/2001 | Agraharam et al. | 709/238 |
| 6,370,560 | B1 | * | 4/2002 | Robertazzi et al. | 718/105 |
| 6,377,975 | B1 | * | 4/2002 | Florman | 709/203 |
| 6,418,462 | B1 | * | 7/2002 | Xu | 709/201 |
| 6,725,250 | B1 | * | 4/2004 | Ellis, III | 709/201 |

OTHER PUBLICATIONS

W. Sullivan et al., "A New Major SETI Project Based on Project SERENDIP data and 100,000 Personal Computers," Astronomical and Biochemical Origins and the Search for the Life in the Universe, 1997. IAU Colloquium No. 161. Also http://citeseer.nj.nec.com/context/1281299/0.

\* cited by examiner

*Primary Examiner*—Bharat Barot
*Assistant Examiner*—Asad Muhammad Nawaz
(74) *Attorney, Agent, or Firm*—Charles W. Peterson, Jr.; Marc D. McSwain

(57) ABSTRACT

A distributed processing system, program product and method of executing a computer program distributed across a plurality of computers. First, interested participants register and provide a commitment for available excess computer capacity. Participants may enter a number of available hours and machine characteristics. A normalized capacity may be derived from the machine characteristics and a normalized excess capacity may be derived from the number of hours committed for the participant. New registrants may be assigned benchmark tasks to indicate likely performance. Parties may purchase capacity for executing large computer programs and searches. The computer program is partitioned into multiple independent tasks of approximately equal size and the tasks are distributed to participants according to available excess capacity. A determination is made whether each distributed task will execute within a selected range of other distributed tasks and, if not, tasks may be reassigned. The likelihood that a task will complete may be based on the participant's past performance. As each task is completed, the completing participant is checked to determine if the task is on schedule. Any task assigned to computers that are found to be behind schedule may be reassigned to other participants. A check is made to determined whether each task is assigned to at least one participant and several tasks may be assigned to multiple participants. Once all tasks are complete, the best result is selected for each task. Each participant may be compensated for normalized excess capacity and that compensation and charges to requesting parties may be based on total available normalized capacity.

8 Claims, 4 Drawing Sheets

Registration Form

Participant's Name: _____  e-mail: _____

Machine type: _____

Processor's Speed: _____ (MHz)

Hours of availability:

Monday _____
Tuesday _____
Wednesday _____
Thursday _____
Friday _____
Saturday _____
Sunday _____

120

Registration Form

Participant's Name: _____   e-mail: _____

Machine type: _____

Processor's Speed: _____ (MHz)

Hours of availability:

Monday _____
Tuesday _____
Wednesday _____
Thursday _____
Friday _____
Saturday _____
Sunday _____

MASSIVELY COMPUTATIONAL PARALLIZABLE OPTIMIZATION MANAGEMENT SYSTEM AND METHOD

BACKGROUND OF THE INVENTION

1. Field of the Invention

The present invention generally relates to distributed processing and more particularly, the present invention relates to encouraging computer participation in distributed processing.

2. Background Description

A complex computer program may be segmented into multiple smaller manageable tasks. The tasks then may be distributed amongst a group of individual computers for independent completion. When a large computer program is partitioned or segmented into modular components and the segmented components are distributed over two or more machines, this is known as distributed processing. Other situations in which a computational task is distributed among several processors may include searching through a large search space (e.g., all subsets of some set of objects) and massive database searches. In such situations, the same program may run on different processors or computers using different inputs. Component placement can have a significant impact on program performance. Therefore, efficiently managing distributed programs and distributed computational tasks is a major challenge, especially when components are distributed over a network to remotely located connected computers, e.g., to computers connected together over the Internet.

A fundamental problem facing distributed application developers is application partitioning and component or object placement. Typically, ad hoc heuristics or other distributed processing models are used to get to some solution that may be very far from the optimum. Problems also arise in component or object scheduling and packing. The economic significance of distributed processing is enormous due to potentially better utilization of human resources and reduction in costly computer hardware purchases.

Many such distributed processing optimization problems involve searches that are conducted in a very large space of N possible solutions. The optimization difficulty is due to the enormous number of possible solutions that must be examined to identify the best solution. Optimization algorithms and search methods have been developed over the past several years that have been successful in solving problems of increasing size, but the size of the problems keeps increasing; So, no matter how much improvement is seen in these algorithms and methods, there is always a need for better solution methods. The primary objective of these approaches is to reduce the program time to completion, as is further described hereinbelow.

Some state-of-the-art search methods derive a significant benefit from increasing the number of processors (P) working in parallel on the same problem, by dividing the problem and sharing the computational requirement amongst the processors. Thus, a brute-force search of the N possible solutions can be sped up by a factor of P, the number of processors employed. So, a problem that might take 30 years to solve on a single machine could be done in a single day by partitioning the problem into 10,000 segments of equal size and allocating each of the segments to one of 10,000 machines.

One approach to these large processing problems is to use parallel computing machines. The recently announced Blue Gene architecture from International Business Machines (IBM) Corporation is projected to incorporate one million processors within a single machine but, may take several years of development. In addition, the cost of such a machine will be prohibitive for most businesses. Consequently, these parallel computer machines still do not provide a realistic solution for large multi-solution searches.

Another approach is, simply, to distribute the 10,000 segments to 10,000 individual machines. With this approach, communication between processors is currently the main problem. However, in search related problems interprocessor communication is not a critical issue. The search machines do not even interact with each other until each one finds a best solution in its "territory."

Even so, acquiring and maintaining 10,000 machines is not a trivial task. Also, since hardware costs keep falling, purchasing a large number of computers is a losing investment. Furthermore, maintaining such a volume of hardware requires retaining human resources that are also typically very expensive. So, it is impractical for a single business to allocate the resources to purchase and maintain more than 10,000 parallel machines to solve large search problems that may arise only infrequently.

For an example of another approach, see U.S. Pat. No. 6,112,225 entitled "Task Distribution Processing System and the Method for Subscribing Computers to Perform Computing Tasks During Idle Time" to Kraft et al., assigned to the assignee of the present invention and incorporated herein by reference. Kraft et al. teaches a distributed programming system wherein subtasks are distributed to requesting distributed computers "on demand." As described in Kraft et al., a coordinating computer segments a program and, then, distributes segments to requesting computers upon occasion of a request. When and how program distribution occurs depends on when enough computers have requested tasks. Further, a slow computer executing a single task may impede program completion. Also, until the last task is assigned, when the program will complete cannot be predicted with any certainty.

Thus, there is a need for reducing computer program execution time, especially for searching, and for making massively parallel computer resources available at a reasonable cost.

SUMMARY OF THE INVENTION

It is therefore a purpose of the present invention to reduce computer program execution time;

It is another purpose of the present invention to reduce computer search time;

It is yet another purpose of the present invention to identify excess computer capacity;

It is yet another purpose of the present invention to provide large partitionable computer program users with excess computer capacity;

It is yet another purpose of the invention to identify excess computer capacity and provide identified computer capacity to large partitionable computer program users.

The present invention is a system, program product and method of doing business wherein excess capacity is obtained from individual computer owners and marketed for use in distributed processing applications wherein a computer program is partitioned into segments and the segments are executed using the excess capacity. First, interested participants register and provide a commitment for available excess computer capacity. Participants may enter a number of available hours and machine characteristics. A normalized capacity may be derived from the machine characteristics and a normalized excess capacity may be derived from the number of hours committed for the participant. New registrants may be assigned benchmark tasks to indicate likely performance. Parties may purchase capacity for executing large computer programs and searches. The computer program is partitioned into multiple independent tasks of approximately equal size and the tasks are distributed to participants according to available excess capacity. A determination is made whether each distributed task will execute within a selected range of other distributed tasks and, if not, tasks may be reassigned. The likelihood that a task will complete may be based on the participant's past performance. As each task is completed, the completing participant is checked to determine if the task is on schedule. Any task assigned to computers that are found to be behind schedule may be reassigned to other participants. A check is made to determined whether each task is assigned to at least one participant and several tasks may be assigned to multiple participants. Once all tasks are complete, the best result is selected for each task. Each participant may be compensated for normalized excess capacity and that compensation and charges to requesting parties may be based on total available normalized capacity.

BRIEF DESCRIPTION OF THE DRAWINGS

The foregoing and other objects, aspects and advantages will be better understood from the following detailed preferred embodiment description with reference to the drawings, in which:

FIG. 2 shows an example of a registration form for registering excess capacity of a computer for use in distributive processing;

DETAILED DESCRIPTION OF A PREFERRED EMBODIMENT OF THE INVENTION

Figure 1:
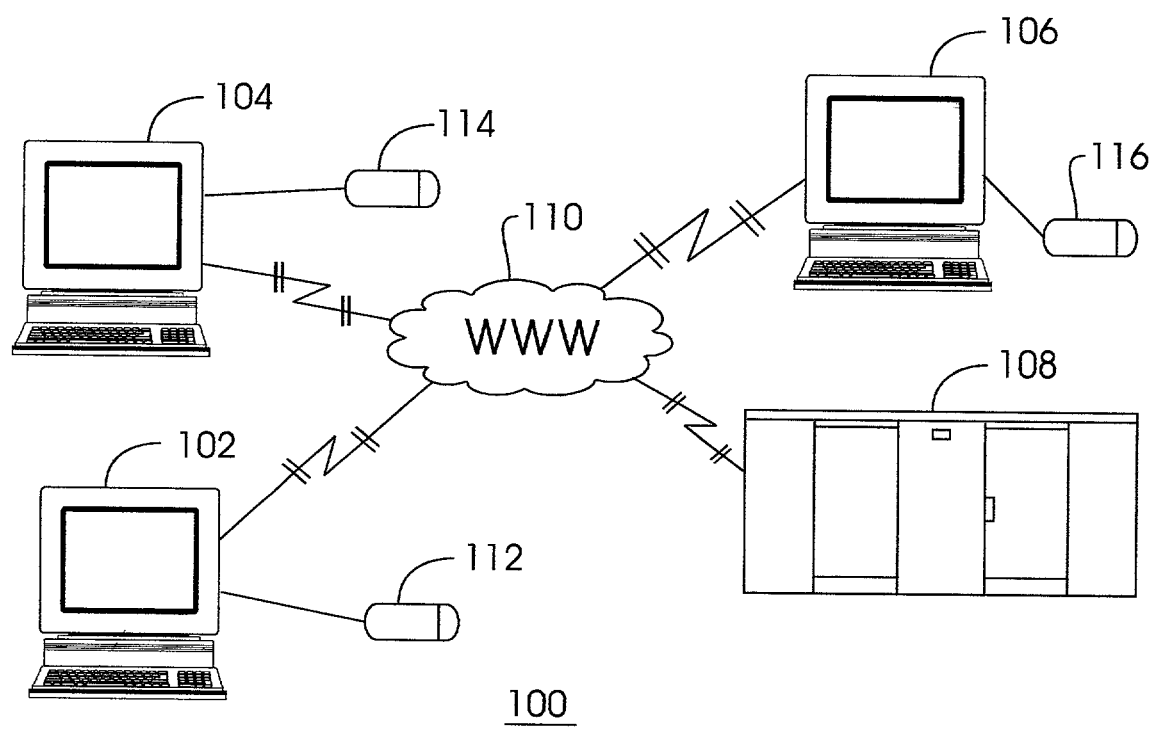
FIG. 1 is an example of a distributed processing system for massively parallel distributed processing according to the preferred embodiment of the present invention.

Referring now to the drawings, and more particularly, FIG. 1 is an example of a distributed processing system 100 for massively parallel distributed processing according to the preferred embodiment of the present invention. The preferred system 100 includes multiple participating computers 102, 104 and 106 that may be remotely connected to one or more servers 108, also participating. One or more servers 108 may include a knowledge base of potential participants. The computers 102, 104, 106, and server 108 may be connected together, for example, over what is known as the Internet or the World Wide Web (www) 110.

The present invention takes advantage of the increasing number of personal computers connected to the Internet by DSL, cable or fiber. There is a very large number of home computers that are connected together over the Internet 24 hours a day, 7 days a week. Most personal computers owners do not utilize the full processor power and so have excess capacity. Typically, these connected computers are 100% idle for large periods of time, e.g., viewing a web page, typing on a word processor or just running a screensaver, each of which is not a processor intensive operation. So, during these idle periods even when the computer is in use, processor usage often is low. The preferred embodiment service, therefore, contracts for the excess capacity of a large number of continuously on-line personal computers, purchasing that excess capacity, and makes that capacity available as parallel processing resources purchased by interested third parties.

FIG. 2 shows an example of a registration form 120 for registering excess capacity of a computer as available for use in distributive processing according to preferred embodiment of the present invention. Registrants are compensated for use of their excess capacity by a third party. Each registrant may provide, for example, a name, e-mail address, along with a machine type (e.g., DOS, Windows, Unix), processor speed and periods when machine capacity is expected to be available for the system 100. How much each registrant is paid may depend upon the scarcity of such excess capacity as well as projected user demand.

Figure 3:
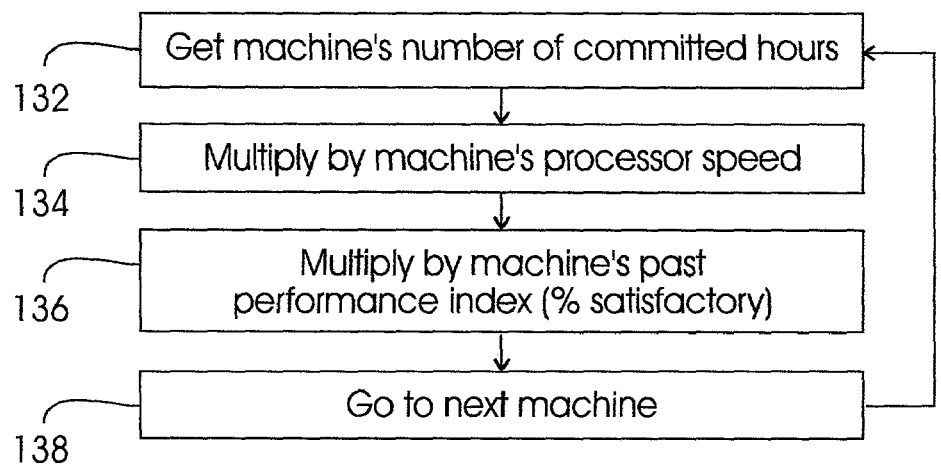
FIG. 3 is a flow diagram showing the preferred step in estimating available capacity.

FIG. 3 is a flow diagram showing the preferred steps 130 in estimating available capacity. First, in step 132, taking the data provided from a registering participant in the registration form 120, the number of committed hours is determined for the registrant. Then, in step 134, the registrant's number of committed hours is multiplied by the machine's processor speed to provide an effective capacity. For example, if a registrant signs up for 10 hours a day with a processor running at 430 MHz, the effective capacity is 4300 MHz-hrs. In step 136, the effective capacity is multiplied by a performance index (e.g., a processor performance comparison) to provide a normalized excess capacity. Then, in step 138, data for the next registrant's machine is selected and steps 132–138 are repeated until a normalized excess capacity has been generated for each registrant.

For reliable service, dependence on individual machines must be minimized. Therefore, computational tasks are assigned to multiple different machines, each assignment having large degree of overlap. Thus, visually analogizing each single task as a small "file," preferably, the search space is covered with several "layers" of such tiles rather than a single layer. Further, the tiling patterns of the different layers are spaced differently or staggered to overlap layers and avoid losing a large number of points that could occur from the tiles all lying exactly on top of each other. Thus, for example, each point of the space may be covered by 10 overlapping layers of tiles and it suffices that any one covering tile is executed for a point to be covered.

Initially, the participating machine 102, 104, 106, 108 receives a small software package that is responsible for receiving and handling the computational tasks. Tasks are assigned to each registrant with respect to the time availability and the speed of the processor, i.e., effective capacity. Preferably, the computer program is partitioned and tasks assigned so that each registrant will complete each assigned task by a desired target time. After assignment, the tasks can be transmitted automatically to participants using any suitable known protocol without human intervention.

Figure 4:
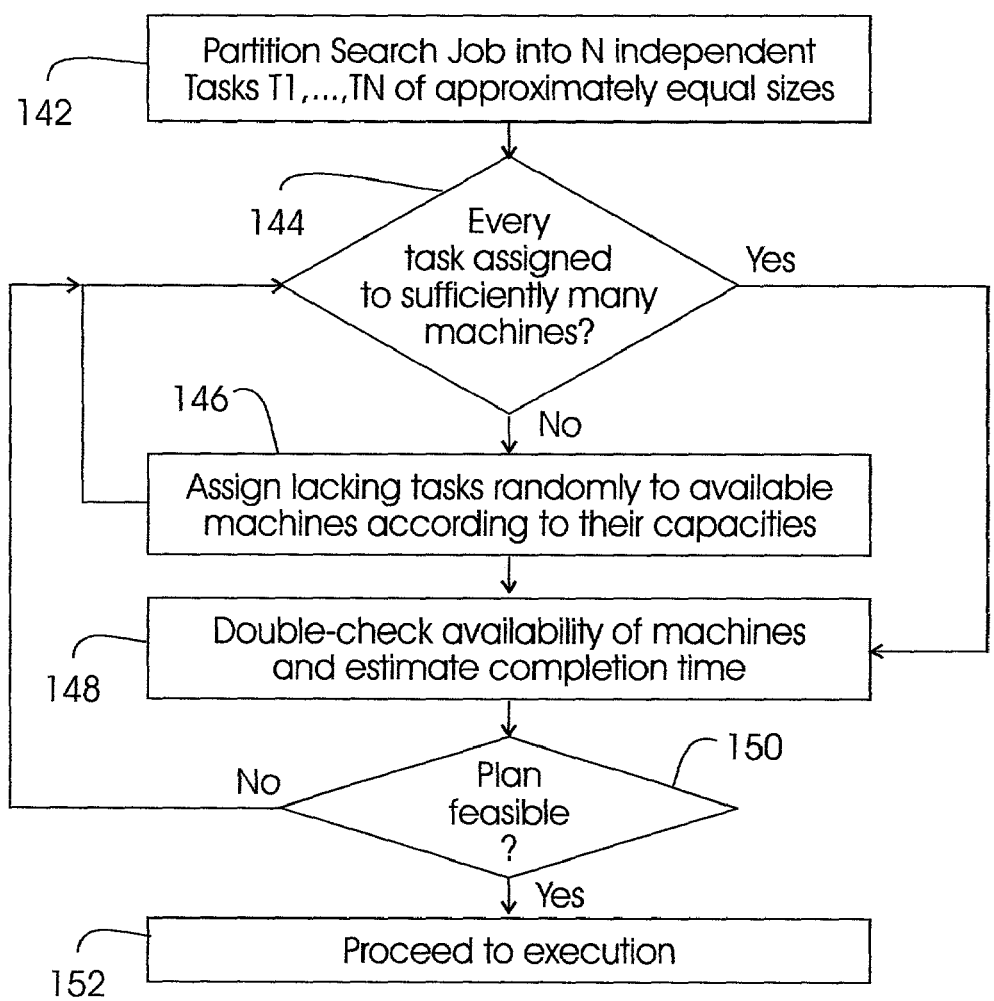
FIG. 4 is a flow diagram showing the preferred steps in allocating tasks to participating machines.

FIG. 4 is a flow diagram 140 showing the preferred steps in allocating tasks to participating machines 102, 104, 106, 108. In step 142, the computer program is partitioned into tasks of approximately equal size and each of the tasks are assigned to one of the participating machines. As an example of task assignment, in a search space that contains N objects, each object numbered 1, 2, . . . , N, it may take one millisecond to check a single object on a machine with a 433 MHz processor. Each such machine can check 3,600,000 objects in an hour. In this example, one hour of machine time is a convenient unit for assignment. Thus, a participant with such a machine signing up for 6 hours a day, and based on an established reliable track record of having capacity available as promised, the participant is allocated 19,600,000 objects a day. The first "tiling" assignment is implemented by assigning a subset of contiguous objects for an area to each participant, e.g., 1, 2, . . . , N1 objects or tiles to participant 1, N1+1, N1+2, . . . , N2 objects to participant 2, and so on for the participants in implementing the first layer. Subsequent layers are assigned similarly, except that for each layer the set of indices 1, . . . , N is first permuted, randomly, to insure shuffling area assignments. The maximum number of assignable tasks is limited only by the number of participating machines available and, preferably, there are more participants than the number of tasks.

Proceeding to step 144, the tasks or objects are checked to verify that each object has been assigned to at least one machine 102, 104, 106, 108. If not, in step 146, as yet unassigned tasks are assigned, randomly, to any machine with available capacity. Preferably, larger tasks are assigned to machines with higher levels of available capacity and smaller tasks are assigned to machines with less available capacity, based on the machine's figure of merit as determined in step 136. Once every task has been assigned to an appropriate machine, the availability of the machines is re-checked in step 148 and a completion time is estimated.

In step 150, a determination is made whether the assignment has produced a practical solution based on the completion time estimate. Participating machines are evaluated on regular basis and a probability measure is developed for each machine with respect to fulfilling commitments. Preferably, the probability measure is the past average rate of satisfaction. For any machine's first participation the probability measure is based on the average rate of satisfaction for the first-timers. Thus, the metric upon which the determination is made of whether the solution is practical is the probability of completing the whole task by the customer's due time. If the solution is not practical because one or more machines will not complete on time, then returning to step 144, tasks are reassigned to achieve a better solution. Otherwise, in step 152, distributed execution of the computer program is begun.

Results from all of the participating machines are monitored and compared to each other, sorting out the best solutions. Execution progress is monitored by checking which machines are actually working on their assigned tasks as scheduled (this function is provided in the above-mentioned software package wherein the machine acknowledges that it has received a task and periodically reports its progress). The search space is checked for any portions that may not be covered, reassigning respective uncovered tasks to free machines as capacity becomes available for further work. The performance of the participating machines is monitored and tasks are selected and reassigned with respect to the observed levels of available capacity.

Figure 5:
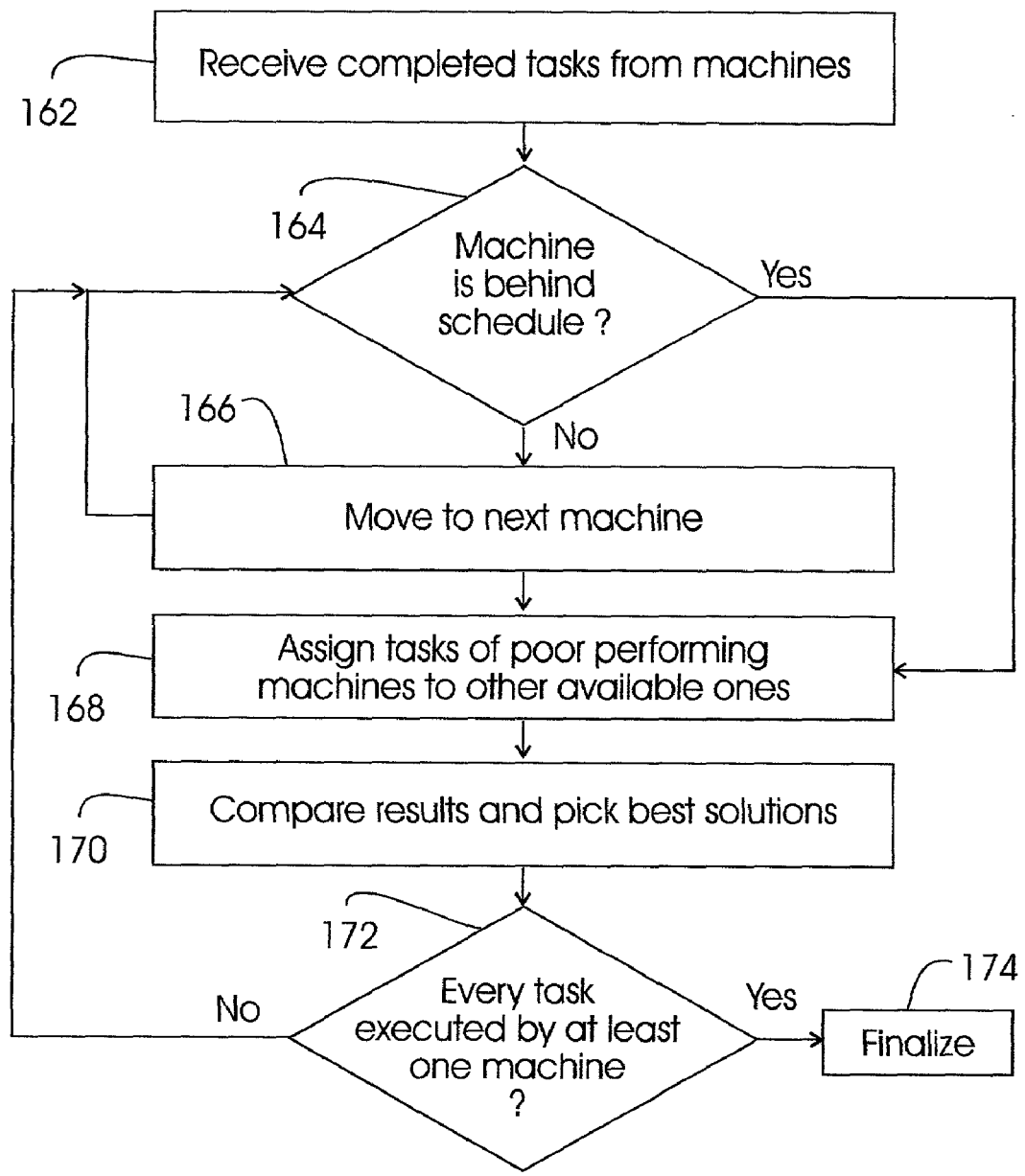
FIG. 5 is a flow diagram showing the steps of monitoring execution to verify that the distributed program will be completed on schedule.

FIG. 5 is a flow diagram 160 showing the steps of monitoring execution to verify that the distributed program will be completed on schedule. After step 152 of receiving tasks and beginning execution, in step 162, as each machine 102, 104, 106, 108 completes a particular assigned task, it passes its results to a central machine, e.g., to server 108. In step 164, the central machine 108 checks to see whether the particular machine is behind schedule. If not, in step 166, the machine with the next completed task is selected and, returning to step 164, results from that next machine are checked to see if it is behind schedule. However, at step 164, if a machine is determined to be behind schedule, then, in step 168, some of the tasks previously assigned to that machine are redistributed and reassigned to other available machines. In step 170, results from each of the assigned machines are checked for identical tasks performed on multiple machines and the best solution is selected.

For example, the well known "traveling salesman" problem calls for finding the shortest route for the salesman to visit a set of assigned locations. The number of possible routes is very large compared to the number of locations. Thus, there is a very large number of feasible solutions. So, the problem is distributed to several participants and each of the participants is given a portion of the space of feasible solutions. In the traveling salesman problem, wherein the goal is to find a feasible solution with minimum objective function value, each participant is given a subset of possible routes. Each participant evaluates the same function at each point in that assigned space and reports back the one solution with the minimum objective function, i.e., the shortest route. The routes are defined implicitly by some constraints, so that searching the subset is possible within the time frame allotted to the participant. Thus, the central system receives single partial solution from each participant, i.e., the shortest route found by each of the participants. Then, the only remaining problem for the central system is comparing those partial solutions (routes) and identifying the best solution of all, i.e., the shortest route.

In step 172, the results are checked to determine whether every program task has been executed by at least one machine 102, 104, 106, 108. If not, then, returning to step 164, a check is made whether the uncompleted tasks are behind schedule and so, task reassignment is necessary. If, however, in step 172, it is determined that every task has been completed by at least one machine, then, in step 174, the distributed computer program task assignment and execution is complete.

Optionally, interested owners can register their machines automatically through a service web site by signing a contract and downloading the necessary software. The newly registered machines may then be evaluated in a simulated environment with benchmark tasks, sending various tasks to the machine at different times as indicated with regard to availability. After passing this optional trial phase, the registered machine can become a fill participant.

While the invention has been described in terms of preferred embodiments, those skilled in the art will recognize that the invention can be practiced with modification within the spirit and scope of the appended claims.

What is claimed is:

1. A method of executing a computer program distributed across a plurality of computers, said method comprising:
   a) obtaining available excess computer capacity from a plurality of potential participants, wherein each participant registers at least one computer by obtaining a committed number of hours for said computer and determining a normalized excess capacity for said computer;
   b) partitioning a computer program into a plurality of independent tasks of approximately equal size;
   c) distributing said tasks to said participants according to available excess capacity;
   d) determining whether each distributed task will execute within a selected range of other said distributed tasks;
   e) beginning execution of said distributed tasks;
   f) receiving completed tasks from said participants; and
   g) determining whether every task has been executed by at least one participant.

2. A method as in claim 1, wherein each said potential participant is provided with one or more benchmark tasks, said participant's normalized excess capacity being adjusted responsive to performance of said benchmark tasks.

3. A method as in claim 1, wherein said partitioning of the computer program includes assigning a plurality of said independent tasks to a plurality of registered computers in an overlapping tiling manner that minimizes dependence on individual computers.

4. A method as in claim 1, wherein the determining whether each task will execute within the selected range flirther includes reassigning any task determined to be unlikely to execute within said range.

5. A method as in claim 1, wherein as each completed task is received, a check is made to determine whether said completed task is on schedule.

6. A method as in claim 3, wherein any participant producing a task that is not on schedule is determined to have a slow machine and other tasks assigned to such slow machines are reassigned to other available participants.

7. A distributed processing system for transferring excess capacity from a plurality of computers to a party requiring execution of a computer program, said distributed processing system comprising:
   a plurality of participating computers connected together over a network, each said computer being registered as available for a committed number of hours;
   means for determining a normalized excess capacity for each participating computer;
   means for partitioning a computer program into a plurality of independent tasks of approximately equal size;
   means for distributing said tasks to said participating computers according to normalized excess capacity;
   means for determining whether each distributed task will complete within a selected range of other said distributed tasks and redistributing any of said tasks determined likely to not complete within said selected range;
   means for receiving completed tasks from said computers; and
   means for determining whether each task has been executed by at least one computer.

8. A computer program product for selling unused excess capacity of a plurality of connected computers to a party requiring execution of a partitionable computer program, said computer program product comprising a computer useable medium having computer readable program code thereon, said computer readable program code comprising:
   computer readable program code means for registering a plurality of participating computers as available for a committed number of hours;
   computer readable program code means for partitioning a computer program into a plurality of independent tasks of approximately equal size;
   computer readable program code means for distributing said tasks to said registered participating computer computers according to normalized excess capacity;
   computer readable program code means for determining whether each distributed task will complete within a selected range of other said distributed tasks and redistributing any of said tasks identified as not completing within said selected range;
   computer readable program code means for receiving completed tasks from said computers; and
   computer readable program code means for determining whether each task has been executed by at least one computer.

* * * * *